(12) United States Patent
Haskin

(10) Patent No.: US 9,410,430 B2
(45) Date of Patent: Aug. 9, 2016

(54) TURBINE APPARATUS WITH COUNTER-ROTATING BLADES

(71) Applicant: Jay Haskin, Bryan, TX (US)

(72) Inventor: Jay Haskin, Bryan, TX (US)

(*) Notice: Subject to any disclaimer, the term of this patent is extended or adjusted under 35 U.S.C. 154(b) by 177 days.

(21) Appl. No.: 14/308,899

(22) Filed: Jun. 19, 2014

(65) Prior Publication Data
US 2015/0369250 A1 Dec. 24, 2015

(51) Int. Cl.
F04D 19/02 (2006.01)
F01D 5/03 (2006.01)
F01D 1/24 (2006.01)
F02C 3/067 (2006.01)
F01D 5/02 (2006.01)

(52) U.S. Cl.
CPC .. F01D 5/03 (2013.01); F01D 1/24 (2013.01); F02C 3/067 (2013.01); F01D 5/022 (2013.01); F05D 2220/31 (2013.01)

(58) Field of Classification Search
CPC ......... F04D 19/024; F01D 1/24; F01D 15/12; F01D 25/162; F01D 25/30; F02C 7/32; F02C 3/107; F02K 3/072; F03B 3/145; F03D 1/025; F03D 1/04; F03D 9/002
See application file for complete search history.

(56) References Cited

U.S. PATENT DOCUMENTS

| 828,618 | A | * | 8/1906 | Marichal | F01D 17/205 415/44 |
| 3,524,318 | A | * | 8/1970 | Bouiller | F02C 3/067 415/60 |
| 3,673,802 | A | * | 7/1972 | Krebs | F02C 3/067 415/79 |
| 4,159,624 | A | * | 7/1979 | Gruner | F02C 3/107 60/268 |
| 4,648,788 | A | | 3/1987 | Jochum | |
| 4,790,133 | A | * | 12/1988 | Stuart | F02K 3/072 415/65 |
| 4,860,537 | A | * | 8/1989 | Taylor | F02C 3/067 415/65 |
| 4,969,325 | A | | 11/1990 | Adamson et al. | |
| 6,278,197 | B1 | | 8/2001 | Appa | |
| 7,195,446 | B2 | | 3/2007 | Seda et al. | |
| 7,290,386 | B2 | | 11/2007 | Orlando et al. | |
| 7,451,592 | B2 | | 11/2008 | Taylor et al. | |
| 8,393,853 | B2 | | 3/2013 | Sauer et al. | |
| 2006/0090451 | A1 | * | 5/2006 | Moniz | F01D 1/24 60/226.1 |
| 2011/0000222 | A1 | * | 1/2011 | Black | F02C 7/20 60/796 |
| 2012/0049523 | A1 | | 3/2012 | Bersiek | |
| 2013/0219859 | A1 | | 8/2013 | Suciu et al. | |
| 2013/0223993 | A1 | * | 8/2013 | Merry | F01D 1/24 415/122.1 |
| 2013/0230380 | A1 | | 9/2013 | Allouche et al. | |

* cited by examiner

Primary Examiner — Igor Kershteyn
(74) Attorney, Agent, or Firm — Egbert Law Offices, PLLC

(57) ABSTRACT

A turbine apparatus has a main shaft, a first set of blades mounted to the main shaft, a second set of blades, and a barrel affixed to a periphery of the second set of blades. The barrel is rotatably mounted independent of a rotation of the main shaft. The barrel and the second set of blades rotates in a direction opposite to the direction of rotation of the first set of blades and the main shaft. A third set of blades is mounted to the main shaft such that the second set of blades is interposed between the first and third sets of blades. An outer shell extends over and an outer surface of the barrel such that the barrel is rotatable interior of the outer shell.

12 Claims, 4 Drawing Sheets

TURBINE APPARATUS WITH COUNTER-ROTATING BLADES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to turbines. More particularly, the present invention relates to steam turbines, gas turbines, process turbines and gas compressors. More particularly, the present invention relates to such turbines where adjacent sets of blades are counter-rotatable with respect to each other.

2. Description of Related Art Including Information Disclosed Under 37 CFR 1.97 and 37 CFR 1.98.

A steam turbine is a device that extracts thermal energy from pressurized steam and uses it to do mechanical work on a rotating output shaft. Because the turbine generates rotary motion, it is particularly suited to be used to drive an electrical generator. Approximately 90% of all electrical generation in the United States is by the use of steam turbines. The steam turbine is a form of heat engine that derives much of its improvement in thermodynamic efficiency from the use of multiple stages in the expansion of the steam. Steam turbines are made in a variety of sizes ranging from small (i.e. less than 0.75 kW) to approximately 1,500,000 kW. The small units are used as mechanical drives for pumps, compressors and other shaft-driven equipment. Large turbines are used to generate electricity.

Turbine blades are of two basic types, blades and nozzles. Blades move entirely due to the impact of steam on them. Their profiles do not converge. This results in a steam velocity drop and essentially no pressure drop as steam moves through the blades. A turbine composed of blades alternating with fixed nozzles is called an impulse turbine, a Curtis turbine, a Rateau turbine, or a Brown-Curtis turbine. Nozzles appear similar to blades, but their profiles converge near the exit. This results in a steam pressure drop and velocity increase as steam moves through the nozzles. Nozzles move due to both the impact of steam on them and the reaction due to the high-velocity steam at the exit. A turbine composed of moving nozzles alternating with fixed nozzles is called a reaction turbine or a Parsons turbine.

Except for low-power applications, turbine blades are arranged in multiple stages in series, called compounding, which greatly improves efficiency at low speeds. A reaction stage is a row of fixed nozzles followed by a row of moving nozzles. Multiple reaction stages divide the pressure drop between the steam inlet and exhaust. Numerous small drops result in a pressure-compounded turbine. Impulse stages may be either pressure-compounded, velocity-compounded, or pressure-velocity compounded. A pressure-compounded impulse stage is a row of fixed nozzles followed by row of moving blades, with multiple stages for compounding. A velocity-compounded impulse stage is a row of fixed nozzles followed by two or more rows of moving blades alternating with rows of fixed blades. This divides the velocity drop across the stage into several smaller drops.

Condensing turbines are most commonly found in electrical power plants. These turbines exhaust steam from a boiler in a partially condensed state at a pressure well below atmospheric to a condenser. Non-condensing or back pressure turbines were most widely used for process steam applications. The exhaust pressure is controlled by a regulating valve to suit the needs of the process steam pressure. These are commonly found at refineries, district heating units, pulp and paper plants, and desalination facilities where large amounts of low-pressure process steam are needed. Reheat turbines are also almost used exclusively in electrical power plants. In a reheat turbine, steam flow exits from a high-pressure section of the turbine and is returned to the boiler where additional superheat is added. The steam goes back into an intermediate pressure section of the turbine and continues its expansion. Using reheat in a cycle increases the work output from the turbine and also the expansion reaches conclusion before the steam condenses. As such, this minimizes the erosion of the blades in the last rows. Extracting-type turbines are common in various applications. In an extracting-type turbine, steam is released from the various stages of the turbine and used for industrial process needs or sent to boiler feedwater heaters to improve overall cycle effect efficiency. Induction turbines introduce low-pressure steam at an intermediate stage to produce additional power.

A gas compressor is a mechanical device that increases the pressure of the gas by reducing its volume. Compressors are similar to pumps. Both increase the pressure on a fluid and both can transport the fluid through a pipe. Since gases are compressible, the compressor also reduces the volume of the gas. Axial-flow compressors are dynamic rotating compressors that use arrays of fan-like airfoils to progressively compress the working fluid. The arrays of airfoils are set in rows, usually as pairs, one rotating and one stationary. The rotating airfoils, also known as blades or rotors, accelerate the fluid. The stationary airfoils, also known as stators or vanes, decelerate and redirect the flow direction of the fluid preparing it for the rotor blades at the next stage. Axial compressors are almost always multi-stage, but the cross-sectional area of the gas passage diminishes along the compressor to maintain an optimal axial Mach number.

In such turbines, a fluid stream, under pressure, impinges on a set of blades (or buckets) connected to a central shaft to produce work. This results in changes in the angular velocity of the fluid stream. These changes in an angular velocity serve to strike the next set of blades connected to the shaft in the most efficient manner. There is an intermediate set of blades which are set at a different angle to realign the flow so as to impinge upon the next set of working blades at the most efficient angle. The set of intermediate blades in most equipment is currently fixed to the stationary element. This process uses approximately 40% of the working fluid energy without producing any work.

In the past, various patents and patent publications have issued relating to such turbines. For example, U.S. Pat. No. 4,648,788, issued on Mar. 10, 1987 to P. Jochum, describes a device and a fluid pressure generator that includes an annular casing which is peripherally mounted and driven in a through-flow channel. The interface of the annular casing forms part of the wall of the through-flow channel. The annular casing is provided with a number of propeller blades which extend radially inwardly into the through-flow channel and which are rotationally mounted on their individual pin shafts by means of which the magnitude of the thrust may be altered in a continuous manner and the direction of the operation of the thrust can be reset.

U.S. Pat. No. 4,969,325, issued on Nov. 13, 1992 Adamson et al., shows a turbofan engine having a counter-rotating partially-geared fan drive turbine. This turbofan engine has a fan section, a booster compressor disposed aft of the fan section relative to the flow of combustion gases through the engine, and a core section disposed aft the booster compressor. A low-pressure counterrotating turbine, disposed aft the core section, is used for driving the fans section and the booster compressor. The counterrotating turbine includes at least one set of rotating turbine blades and at least one set of oppositely rotating counterrotating turbine blades. A twin spool shaft is provided for coupling the turbine blades to the booster compressor and for coupling the counterrotating turbine blades to the fans section.

U.S. Pat. No. 6,278,197, issued on Aug. 21, 2001 the K. Appa, discloses a contra-rotating wind turbine system. A hub assembly is provided having inner and outer coaxial shafts telescopically related but radially spaced to permit independent rotation about a generally horizontal axis. A first set of rotor blades is mounted on the inner shaft at a plurality of circumferentially-spaced locations. The rotor blades extend radially away from the axis of rotation and positioned on the inner shaft for rotating the inner shaft in a first direction about the axis of rotation when subjected to wind-induced airflow. A second set of rotor blades is similarly mounted on the outer shaft axially spaced from the first set of rotor blades for rotating the outer shaft about the axis of rotation in an opposite direction.

U.S. Pat. No. 7,195,446, issued a Mar. 27, 2007 to Seda et al., provides a counter-rotating turbine engine that provides a low-pressure turbine inner rotor configured to rotate in a first direction and a low-pressure turbine outer rotor configured to rotate in a second direction that is opposite to the first rotational direction. At least one foil bearing is coupled to at least one of the inner and outer rotors so as to improve clearance control between a first rotating component and at least one of a second rotating component and a non-rotating component.

U.S. Pat. No. 7,290,386, issued on Nov. 6, 2007 to Orlando et al., teaches a counter-rotating gas turbine engine. A low-pressure turbine inner rotor includes a first plurality of turbine blade rows configured to rotate in a first direction and a low-pressure turbine outer rotor rotatably coupled to the inner rotor. The outer rotor includes a second plurality of turbine blade rows that are configured to rotate in a second direction that is opposite the first rotational direction of the inner rotor such that at least one of the second plurality of turbine blade rows is coupled axially forward of the first plurality of turbine blade rows.

U.S. Pat. No. 7,451,592, issued on Nov. 18, 2008 to Taylor et al., teaches a counter-rotating turbine engine which includes a gearbox. The turbine engine arrangement is provided with contra-rotating shafts and a gearbox which is also coupled to a shaft. The relative rotational speed ratio between the shafts can be determined with a first low-pressure turbine secured to the first shaft arranged to rotate at a lower speed but provide high work whilst a second low-pressure turbine secured to the second shaft rotates at a higher speed governed by the gearbox.

U.S. Pat. No. 8,393,853, issued on Mar. 12, 2013 to Sauer et al., provides a high-efficiency turbine and method of generating power. The turbine includes a plurality of blades that rotate in a single direction when exposed to a fluid flow. The plurality of blades are joined to the central shaft by a plurality of radial spokes disposed substantially perpendicular to the central shaft such that the rotating plurality of blades causes the shaft to rotate.

U.S. Patent Publication No. 2012/0049523, published on Mar. 1, 2012 to S. A. Bersiek, describes a wind jet turbine with fan blades located on an inner and outer surface of the cylinder so as to allow wind or liquid to pass through the inner and outer blades. The wind jet turbine has a first set of fan blades, a plurality of magnets that each has a magnetic field, a cylinder having an inside and outside surface that supports the first set of fan blades on the inside surface and coupled to the plurality of magnets, and at least one cable winding located apart from the magnets. The rotation of the cylinder results in the movement of the magnetic field across at least one cable winding.

U.S. Patent Publication No. 2013/0219859, published in Aug. 29, 2013 to Suciu et al., provides a counter-rotating low-pressure compressor and turbine. The compressor section includes a counter-rotating low-pressure compressor that includes outer and inner compressor blades interspersed with one another and configured to rotate in opposite directions to one another about an axis of rotation. A transmission couples at least one of the outer and inner compressor blades to a shaft. The turbine section includes a counter-rotating low-pressure turbine having an outer rotor that includes an outer set of turbine blades. An inner rotor has an inner set of turbine blades interspersed with the outer set of turbine blades. The outer rotor is configured to rotate in an opposite direction about the axis of rotation from the inner rotor. A gear system couples at least one of the outer and inner rotors to the shaft.

U.S. Patent Publication No. 2013/0230380, published on Sep. 5, 2013 to Allouche et al., discloses a rotating housing turbine. The housing has a side wall. The turbine blades are attached to the side wall. The turbine is completely open in the center so as to allow a space for solids and debris to be directed out of the turbine without jamming the spinning blades/side wall.

It is an object of the present invention to provide a turbine apparatus that uses a greater percentage of the energy of the working fluid.

It is another object of the present invention to provide a turbine apparatus that can be used so as to power components are directed back to primary driven equipment.

It is another object of the present invention to provide a steam turbine that is suitable for powering boiler feed pumps, auxiliary pumps, hydraulics, and electrical generators.

These and other objects and advantages of the present invention will become apparent from a reading of the attached specification and appended claims.

BRIEF SUMMARY OF THE INVENTION

The present invention is a turbine apparatus that comprises a main shaft, a first set of blades mounted to the main shaft, a second set of blades, and a barrel affixed to a periphery of the second set of blades. The barrel is rotatably mounted independently of a rotation of the main shaft.

A third set of blades is mounted to the main shaft. The second set of blades is interposed between the first and third sets of blades. The first and third sets of blades are rotatable in a direction opposite to a direction that the second set of blades rotate.

A means is provided for transferring rotational energy of the second set of blades and the barrel to a power source, such as an electrical generator, a boiler feed pump, a compressor, a water pump, a hydraulic unit, and other items. An outer shell extends over an outer surface of the barrel. The barrel is rotatable interior of the outer shell. The power source is connected the main shaft such that rotation of the first set of blades and the main shaft causes the electrical generator to produce a power source.

A fluid inlet is directed toward the first set of blades and within an interior of the barrel. The fluid inlet includes a nozzle for directing a fluid into the interior of the barrel toward the first set of blades. A plurality of fan blades are affixed to the barrel and extend outwardly therefrom. The plurality of fan blades are positioned interior of the outer shell. The means for transferring rotational energy can be a planetary gear arrangement that is connected to the barrel and cooperative with the main shaft or independent of the main shaft so as to transfer energy from the rotation of the barrel to the main shaft or to another shaft.

In the embodiment of the present invention, the barrel can include a first section and a second section. The second section has another set of first blades positioned therein and another second set of blades affixed at a periphery thereof. A fluid inlet is directed to an interior of the barrel in an area between the first section and the second section. An exhaust outlet is positioned rearwardly of the second set of blades. The exhaust outlet is suitable for passing exhaust gases outwardly of the barrel. In this alternative embodiment, the first set of blades has an outer diameter that is less than an outer diameter of the second set of blades. Also, the first set of blades has an outer diameter that is smaller than an outer diameter of the third set of blades.

A fourth set of blades can be provided having an outer periphery affixed to the barrel. The third set of blades is interposed between the second set of blades and the fourth set of blades. The first and third sets of blades rotate in a direction opposite to a direction that the second and fourth set of blades rotate.

The foregoing Section is intended to describe, with particularity, the preferred embodiment of the present invention. It is understood that modifications to this preferred embodiment can be made within the scope of the present invention. As such, this Section should not to be construed, in any way, as limiting of the scope of the present invention. The present invention should only be limited by the following claims and their legal equivalents.

DETAILED DESCRIPTION OF THE INVENTION

Figure 1:
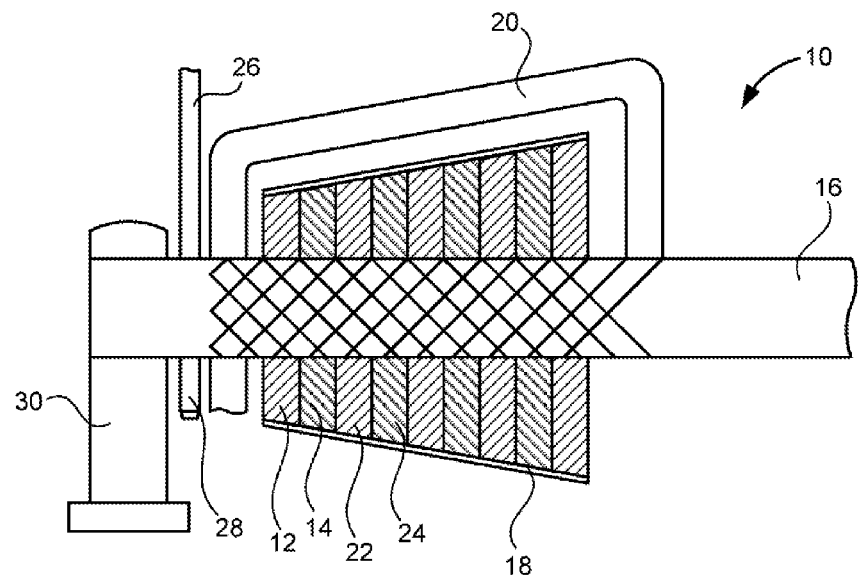
FIG. 1 is a cross-sectional view showing a simplified form of the turbine apparatus the present invention.

Referring to FIG. 1, there shown the turbine apparatus 10 in accordance with the present invention. The turbine apparatus 10 includes a first set of blades 12, a second set of blades 14, a main shaft 16, a barrel 18, and an outer shell 20. In FIG. 1, it can be seen that the first set of blades 12 is directly mounted to the main shaft 14. The second set of blades 14 is directly mounted, at a periphery thereof, to the barrel 18 or the housing. The main shaft 16 extends centrally through the first set of blades 12 and the second set of blades 14. The main shaft 16 is not connected to the second set of blades 14. In the preferred embodiment the present invention, the second set of blades 14 will rotate in a direction opposite to the second set of blades 12 and to the direction of rotation of the main shaft 16. As a result, the barrel 18 will rotate in a direction opposite to the rotation of the main shaft 16.

In FIG. 1, it can be seen that there is a third set of blades 22 that is affixed to the main shaft 16. The third set of blades 22 extends in generally parallel relationship to the first set of blades 12. The second set of blades 14 is positioned between the first set of blades 12 and the second set of blades 14. There is a fourth set of blades 24 that is mounted, at the periphery thereof, to the barrel 18. As such, when the first of blades 12 and the third set of blades 22 rotate with the rotation of the main shaft 16, the second set of blades 14 and the fourth set of blades 24 will rotate in the opposite direction. Within the configuration of the present invention, the odd numbered sets of blades will rotate in an opposite direction to that of the even-numbered sets of blades.

A fluid inlet 26 is directed toward the first set of blades 12 within the interior of the barrel 18. The fluid inlet 26 includes a nozzle 28 for directing the fluid into the interior of the barrel 18 and toward the first set of blades 12. The injection of the fluid through the fluid inlet 26 will impart rotational movement to the first set of blades 12. The direction of the blades within the first set of blades 12 will impart an opposite directional movement to the second set of blades 14 such that the barrel 18 will rotate in the opposite direction. The orientation of the blades of the second set of blades 14 will be directed to the third set of blades 22 so as to further direct rotational energy toward the third set of blades 22. Similarly, the orientation of the blades in the third set of blades 22 is directed to the fourth set of blades 24 so as to further enhance the torque applied by the fourth set of blades 24 to the barrel 18.

The shaft 16 is mounted within bearings and supported by a bearing pedestal 30. The bearing pedestal 30 can be supported upon an underlying surface, such as a floor. The bearing supports the main shaft 16 in a rotatable configuration. The rotatable shaft 16 can extend for use exterior of the turbine apparatus 10. For example, the main shaft 16 can extend so as to be linked to a power source, such as an electrical generator, a boiler feed pump, a compressor, a water pump, a hydraulic unit, or other systems that can utilize rotational energy.

The outer shell 20 extends around the exterior of the barrel 18. As such, the interior of the outer shell 20 is sufficiently sealed so as to avoid loss of pressurized fluid and friction with exterior elements.

As will be described hereinafter, the rotating barrel 18 can be suitably coupled to allow for the rotation of another shaft or to facilitate the rotation of the main shaft 16. For example, the rotating barrel 18 can be coupled by a gear arrangement to another shaft located adjacent to the main shaft 16. Alternatively, a planetary gear arrangement can be coupled between the barrel 18 in the main shaft 16 such that rotational energy of the barrel 18 can be delivered to the main shaft. Still further and alternatively, various rollers, or other connecting devices, can be coupled to the barrel 18 such that the rotating energy of the barrel 18 can be delivered for external use.

Figure 2:
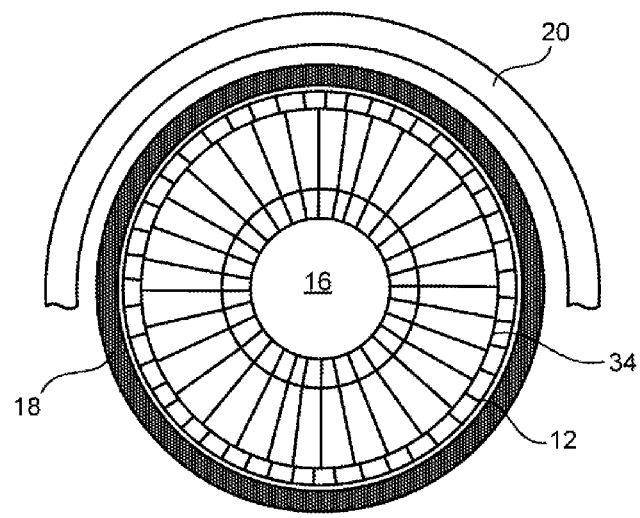
FIG. 2 is an isolated end view showing the configuration of blades as mounted to the shaft.

FIG. 2 illustrates, in particular, how the first set of blades 12 is mounted to the main shaft 16. The first set of blades 12 extends radially outwardly of the main shaft 16. The first set of blades 12 is arranged in a circular configuration so as to have an outer periphery 34 that is positioned adjacent to but free of the inner wall of the barrel 18. The outer shell 20 is positioned in spaced relation relationship to the outer surface of the barrel 18.

Figure 3:
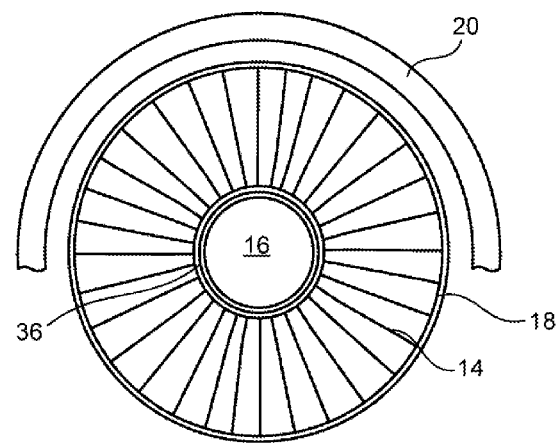
FIG. 3 is an end view showing the configuration of blades as mounted to the barrel.

FIG. 3 illustrates the manner in which the second set of blades 14 is mounted at the outer periphery thereof to the barrel 18. The second set of blades 14 has an inner surface 36 that is in spaced relationship to the outer surface of the main shaft 16. As a result, the second set of blades 14 can rotate independently of the rotation of the main shaft 16. The outer wall of the barrel 18 is positioned in spaced relationship to the outer shell 20.

The turbine apparatus 10 of the present invention serves to free the those blades that would be fixed to a stationary member of a conventional turbine apparatus. As such, these free blades are available to produce work. This results in a rotation in an opposite direction to the primary blades. The energy that would be captured by attaching blades to a segment or to the barrel which is allowed to move. As such, previously lost energy is now captured. The barrels or segments can be attached together such that the energy can be collected in a manner that can be harnessed. As such, the barrel 18, as illustrated in FIGS. 1-3, can be made up of a plurality of separate segments that are interconnected together. The resulting energy can be used to power other components or directed back to the primary-driven equipment.

As can be seen in FIG. 1, the counter-rotating blades are attached to the barrel 18 or to an intermediate shell. This would be within the outer shell 20 because of pressure considerations. The energy thus harnessed could be used for powering boiler feed pumps, auxiliary pumps, hydraulics, or for generating electricity. FIG. 1 further shows that the rows of blades alternate between those blades that are affixed to the main shaft and the blades that are fixed to the barrel or outer connection.

Figure 4:
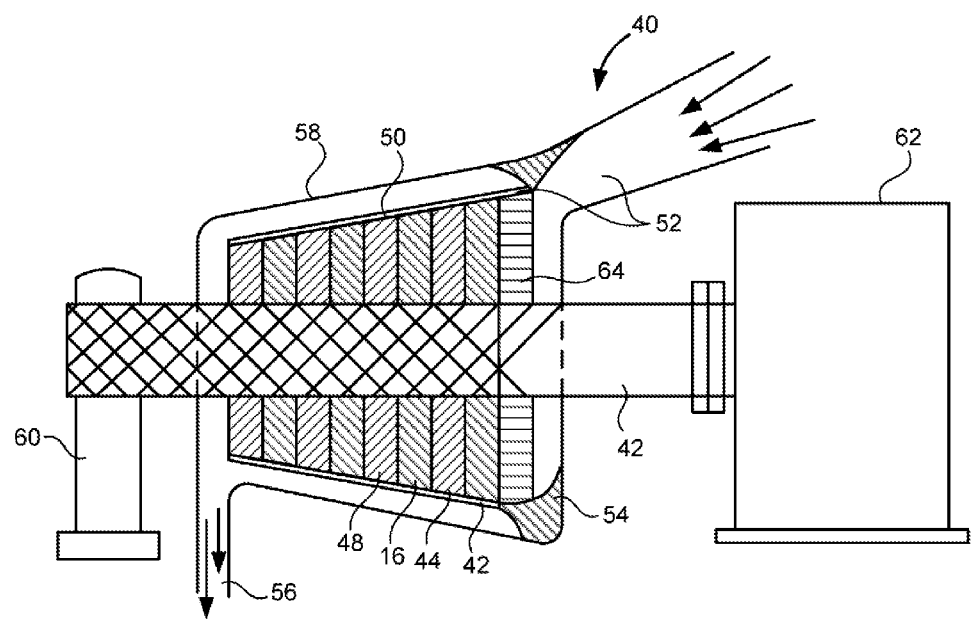
FIG. 4 is a cross-sectional view showing a first gas compressor alternative embodiment of the present invention.

FIG. 4 shows an alternative embodiment of the present invention in the form of a gas compressor 40. In FIG. 4, the gas compressor 40 includes the main shaft 42, the first set of blades 43 the second set of blades 44, the third set of blades 46 and the fourth set of blades 48. The first and third sets of blades will rotate in the same direction. The second and fourth sets of blades will rotate in the opposite direction. The barrel 50 is affixed to the second set of blades 44 and the fourth set of blades 48. As a result, the barrel 50 will rotate in opposite direction to that of the main shaft 42.

FIG. 4, shows, in particular, the fluid inlet 52. In FIG. 4, fluid is delivered through the interior of a manifold 54 and directed toward the sets of blades 43, 44, 46 and 48. As such, this fluid, such as a gas, will cause the respective rotation of the main shaft 42 and the barrel 50. There is an exhaust outlet 56 positioned at the end of the array of blades. As such, the gas can be properly discharged. An outer shell 58 is provided over the exterior of the barrel 50 for pressure considerations. As such, the fluid can flow through the space between the outer shell 58 and the barrel 50 if the pressure should become too great.

In FIG. 4, it can be seen that the shaft 42 is affixed to a bearing pedestal 60 at one end thereof. The shaft 42 is connected to a power source 62 at an opposite end thereof. A planetary gear arrangement 64 is illustrated as coupling the barrel 52 to the shaft 42. Alternatively, various other types of gearing arrangements can be provided so as to connect the rotatable barrel 50.

In FIG. 4, it can be seen that the power source 62 can also be a pump. The addition to the power applied by the main shaft 42 is also supplied to the barrel 50 so as to drive the intermediate turbine blade stages. This results in a shorter piece of equipment and a better utilization of the power supplied by the power source.

Figure 5:
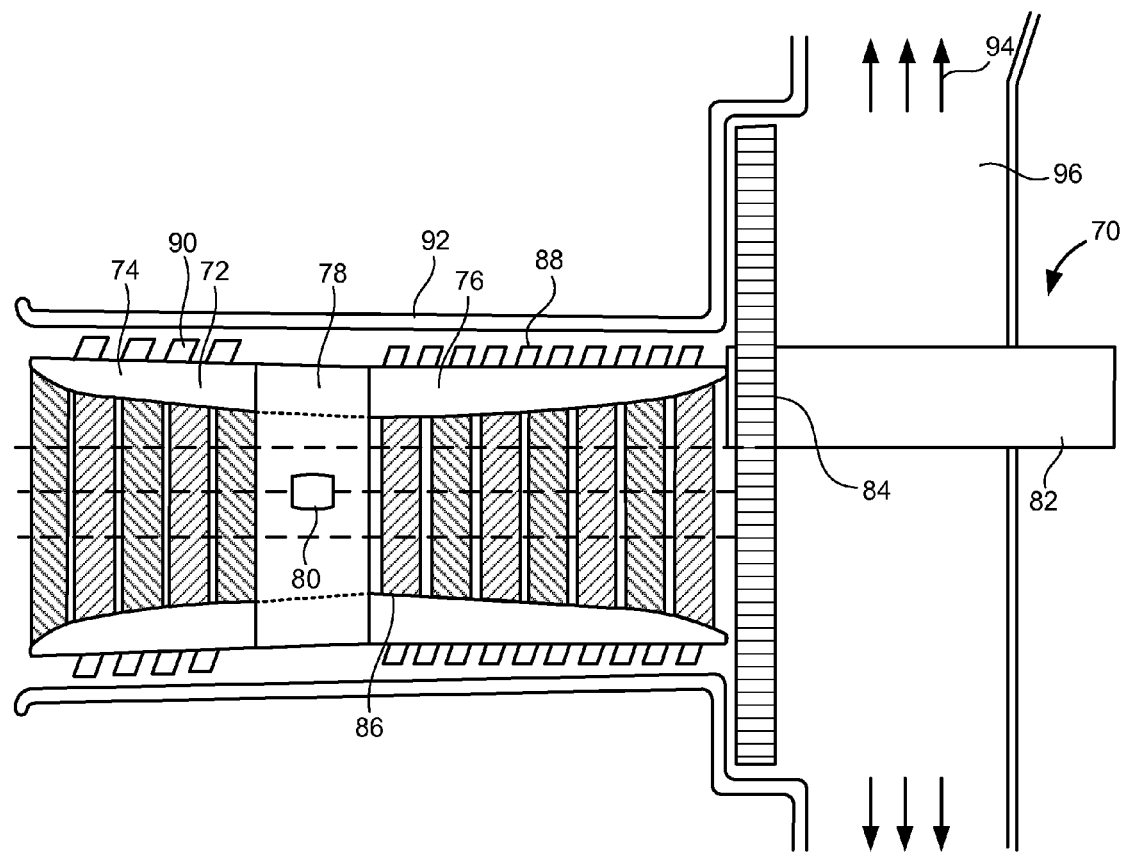
FIG. 5 is a cross-sectional view showing a second gas compressor alternative embodiment of the present invention.

FIG. 5 shows another alternative embodiment of a gas generator 70. In FIG. 5, it can be seen that the turbine apparatus 70 includes a first section 72 of the barrel 74 and a second section 76 of the barrel 74. Each of the sections 74 and 76 will extend from a center section 78. The center section can be a bearing and thrust support or an area in which fuel can be added to the high-pressure air flow and combusted in the secondary section. The fluid inlet can be directed through an central opening 80 and directed outwardly therefrom toward the blades that are attached to the barrel sections 72 and 76. A load stage 84 is connected to an independent shaft 82 to a driving a separate unit. As such, the exhaust gas as well as the air moved by the outer blades 88 and 90 would impinge on the load stage 84.

FIG. 5 illustrates that the fan blades 88 and 90 that extend outwardly of the exterior surface of the barrel sections 72 and 76. These fan blades 88 and 90 extend toward the outer shell 92. The exhaust 94 passes outwardly of an exhaust outlet 96 of the turbine apparatus 70. In another embodiment, the fan blades 88 and 90 can be replaced with magnets.

The turbine apparatus 70 causes the counter-rotating sets of blades to bring additional flow to impinge upon the load stages. This is done by adding the fan blades 88 and 90 to the barrel 94 and/or to the outer shell 92 and then directed toward the load stages. The barrel can also be used to power additional electrical generation, pumps, or miscellaneous auxiliary equipment.

Figure 6:
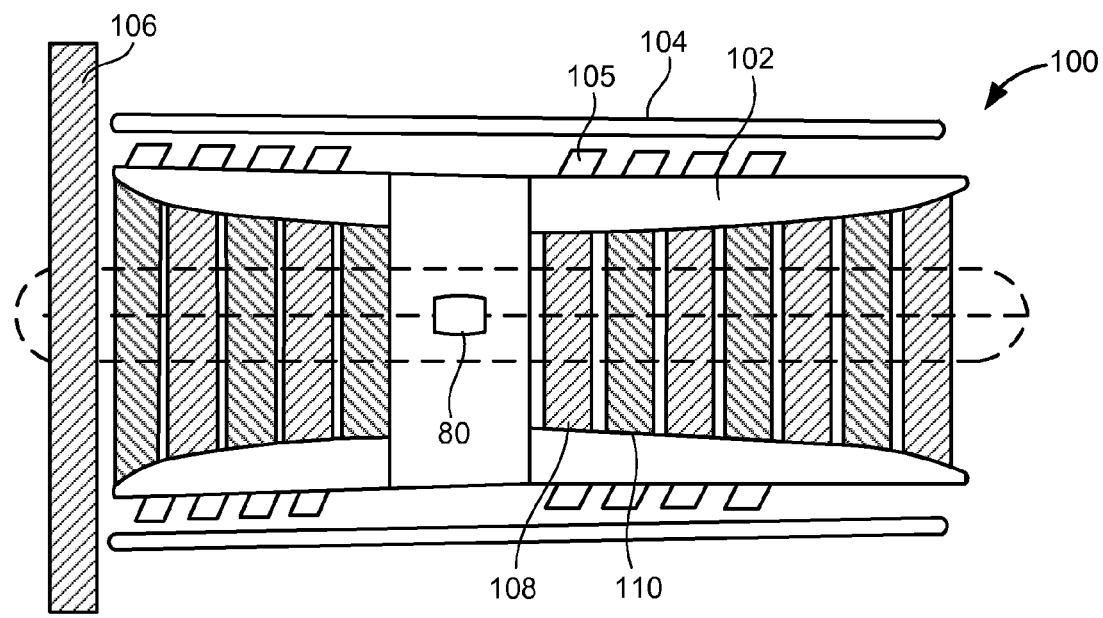
FIG. 6 is a cross-sectional view showing another alternative embodiment of the turbine apparatus of the present invention, in the nature of a turbofan.

FIG. 6 shows another alternative embodiment 100 of the turbine apparatus of the present invention, in the nature of a turbofan. FIG. 6 has a similar configuration to that shown in FIG. 5. However, in FIG. 6, the energy from the barrel 102 or from the outer shell 104 can have fan blades 106 attached to the exterior thereof so as to increase the air flow around the exterior of the turbine. The results in a smaller first set of blades 108 than the diameter of the second set of the fan blades 110. This facilitates the movement of the air around the turbine apparatus 100. The advantage of this is to decrease the frontal areas. As such, drag is also reduced. The segments of barrel 102 can also be used to power auxiliary needs, such as hydraulic, electricals, ventilation systems, or other miscellaneous systems.

The foregoing disclosure and description of the invention is illustrative and explanatory thereof. Various changes in the details of the illustrated apparatus can be made within the scope of the appended claims without departing from the true spirit of the invention. The present invention should only be limited by the following claims and their legal equivalents.

I claim:

1. A turbine apparatus comprising:
   a main shaft;
   a first set of blades mounted to said main shaft;

a second set of blades;
a barrel affixed to a periphery of said second set of blades, said barrel being rotatably mounted independent of a rotation of said main shaft; and
a power source connected to said main shaft such that a rotation of said first set of blades and said main shaft causes said electrical generator to produce an output power.

2. The turbine apparatus of claim 1, further comprising:
a third set of blades mounted to said main shaft, said second set of blades being interposed between said first and third sets of blades, said first and third sets of blades rotatable in a direction opposite to a direction that said second set of blades rotate.

3. The turbine apparatus of claim 1, further comprising:
an outer shell extending over an outer surface of said barrel, said barrel being rotatable interior of said outer shell.

4. The turbine apparatus of claim 1, further comprising:
a fluid inlet directed toward said first set of blades and within an interior of said barrel.

5. The turbine apparatus of claim 4, said fluid inlet having a nozzle for directing a fluid into said interior of said barrel forward of said first set of blades.

6. The turbine apparatus of claim 3, further comprising:
a plurality of fan blades affixed to said barrel and extending outwardly therefrom, said plurality of fan blades being positioned interior of said outer shell.

7. The turbine apparatus of claim 1, said means for transferring rotational energy comprising:
a planetary gear arrangement connected to said barrel and cooperative with said main shaft so as to transfer energy from the rotation of said barrel to said main shaft.

8. The turbine apparatus of claim 4, further comprising:
an exhaust outlet positioned rearwardly of said second set of blades, said exhaust outlet for passing exhaust gases outwardly of said barrel.

9. The turbine apparatus of claim 1, said first set of blades have an outer diameter that is less than an outer diameter of said second set of blades.

10. The turbine apparatus of claim 2, said first set of blades having an outer diameter that is smaller than an outer diameter of said third set of blades.

11. A turbine apparatus comprising:
a main shaft;
a first set of blades mounted to said main shaft;
a second set of blades; and
a barrel affixed to a periphery of said second set of blades, said barrel being rotatably mounted independent of a rotation of said main shaft, said barrel having a first section and a second section, said second section having another first set of blades positioned therein and another second set of blades affixed at a periphery thereof.

12. The turbine apparatus of claim 11, further comprising:
a fluid inlet directed to an interior of said barrel in area between said first section and said second section.

\* \* \* \* \*